United States Patent [19]

Iwase

[11] Patent Number: 5,335,868
[45] Date of Patent: Aug. 9, 1994

[54] WIRE WINDING AND CONNECTING APPARATUS FOR ARMATURE AND COMMUTATOR

[75] Inventor: Hideaki Iwase, Toyohashi, Japan

[73] Assignee: ASMO Co., Ltd., Kosai, Japan

[21] Appl. No.: 832,907

[22] Filed: Feb. 7, 1992

[30] Foreign Application Priority Data

Feb. 12, 1991 [JP] Japan .................. 3-018916
Feb. 6, 1992 [JP] Japan .................. 4-021021

[51] Int. Cl.$^5$ .................. H02K 15/04; H02K 15/09
[52] U.S. Cl. .................. 242/7.05 B
[58] Field of Search .................. 242/7.03, 7.05 B; 29/597, 598

[56] References Cited

U.S. PATENT DOCUMENTS

| | | | |
|---|---|---|---|
| 3,927,469 | 12/1975 | Dammar | 242/7.05 B |
| 4,027,827 | 6/1977 | Biddison | 242/7.05 B |
| 4,633,577 | 1/1987 | Banner | 29/597 |
| 4,708,297 | 11/1987 | Boers | 242/7.05 B |

FOREIGN PATENT DOCUMENTS 58-55745 12/1981 Japan .

Primary Examiner—Andrew M. Falik
Attorney, Agent, or Firm—Venable, Baetjer, Howard & Civiletti

[57] ABSTRACT

A winding apparatus for an armature for automatically providing the armature with coils by winding a wire conductor around an outer periphery of a core of the armature in the form of coils and by hooking the wire conductor around each of connection claws of a commutator of the armature. The apparatus includes a clamp device disposed in the vicinity of an outer periphery of the commutator and adapted to clamp and hold the wire conductor for the winding-start processing and winding-end processing of the wire conductor; a hook member adapted to rotate and move eccentrically about the connection claw to cause the wire conductor to hook around the same, the hook member capable of approaching or moving away from the connection claw; and a cutting device disposed in the vicinity of the clamp device for cutting the wire conductor clamped and held by the clamp device as the cutting device undergoes sliding movement. Operations for providing windings in the winding-start processing, connection processing, and winding-end processing of the wire conductor are simplified, and the time for providing the overall windings is reduced.

17 Claims, 8 Drawing Sheets

WIRE WINDING AND CONNECTING APPARATUS FOR ARMATURE AND COMMUTATOR

BACKGROUND OF THE INVENTION

1. Field of the Invention

The present invention relates to a winding apparatus for winding an armature of a dc motor.

2. Description of the Related Art

With respect to an armature of a dc motor in which a wire conductor (hereafter simply referred to as the wire) is wound around an outer periphery of a core in the form of coils and the wire is hooked around each connection claw of a commutator, a plurality of winding steps are performed by a winding apparatus for an armature so as to provide windings automatically.

That is, the following steps of processing are carried out automatically to provide windings: the step of setting a leading end portion of the wire (winding-start wire) around the connection claw of the commutator (hereafter referred to as winding-start wire processing); the step of winding the wire around the outer periphery of the core (hereafter referred to as winding processing); the step of hooking the wire (hereafter referred to as connection processing) wherein upon completion of the step of winding a fixed amount of wire, an intermediate portion of the wire is hooked around the connection claw; and the step of cutting a winding-end wire (hereafter referred to as winding-end wire processing) for cutting an end portion of the wire (winding-end wire) upon completion of all the winding processing. As a winding apparatus for an armature for automatically effecting the above-described winding processing, a winding apparatus disclosed in, for instance, Japanese Patent Application Publication No. 55745/1983 is known.

In the winding apparatus disclosed in the aforementioned publication, a wire guide member is disposed in correspondence with the outer periphery of the commutator held in a predetermined set position, and a clamper capable of clamping the leading end of the wire is disposed outside the wire guide member. A clamper moving mechanism is connected to this clamper, and is thereby capable of moving in the axial direction of the commutator being held, and of approaching or moving away from the connection claw by moving radially of the commutator.

When conducting winding-start wire processing, the leading end portion of the wire is clamped by the clamper, and in this state the clamper together with the leading end portion of the clamper is moved toward the connection claw of the commutator by the actuation of the clamper moving mechanism and is maintained in that position. Subsequently, when connection processing is to be effected after winding processing, the wire guide member is rotated along the connection claw of the commutator, and a flyer for subjecting the wire to winding processing is operated in response to the rotation of the winding guide member, so as to cause an intermediate portion of the wire to be hooked around the connection claw. Furthermore, when conducting winding-end processing upon completion of all the winding processing, the end portion of the wire is clamped again by the clamper, and in this state a cutter is actuated to cut off the winding-end wire.

With such a winding apparatus for an armature, the winding processing can be performed automatically, as described above, so as to provide the armature with windings.

With the above-described conventional winding apparatus, however, there have been drawbacks in that the operation of each component part is complicated, and that a long time is required for providing the windings.

That is, during winding-start wire processing, an operation is necessary for causing the clamper to move consecutively in a plurality of directions for clamping the wire, so that it inevitably takes time in holding the leading end portion of the wire at a predetermined position. In addition, during connection processing, it is necessary to conduct a complicated synchronized (interlocked) operation while constantly causing the rotating movement of the wire guide member to correspond to the rotating movement of the flyer. Accordingly, the control itself is not easy, and there are limits to effecting a speedy operation. Furthermore, during winding-end wire processing, since the cutter is actuated to cut the wire after temporarily clamping the end portion of the wire by means of the clamper, in other words, since a two-stage operation is required, it inevitably takes time in this case as well.

Thus, with the conventional winding apparatus for an armature, it is possible to effect winding processing automatically; on the other hand, the processing takes enough time that there has been a demand for making it possible to effect winding processing within a shorter time.

SUMMARY OF THE INVENTION

In view of the above-described circumstances, it is an object of the present invention to provide a winding apparatus for an armature capable of providing windings within a short time through simple operations.

To this end, in accordance with the present invention, there is provided a winding apparatus for an armature for automatically providing the armature with windings by winding a wire conductor around an outer periphery of a core of the armature and by hooking the wire conductor around each of the connection claws of a commutator of the armature, comprising: a clamp device disposed in such a manner as to substantially oppose an outer periphery of the commutator inserted in an axial direction and held in a predetermined set position, the clamp device being adapted to clamp the wire conductor at a predetermined position substantially opposed to one of the connection claws of the commutator for effecting winding-end processing of the wire conductor and to hold the clamped wire conductor for winding-start processing of the wire conductor; a hook member disposed in such a manner as to substantially oppose one of the connection claws of the commutator being held in the predetermined set position, and arranged eccentrically with respect to a line perpendicular to an axis of the commutator, the hook member being adapted to cause the wire conductor to be hooked around the connection claw by undergoing rotating movement about a line passing through the connection claw in the perpendicular line, the hook member being capable of moving in such a manner as to approach or move away from the connection claw along the perpendicular line; and a cutting device disposed in the vicinity of the clamp device in such a manner as to be slidably movable in an axial direction of the commutator, the cutting device being adapted to cut the wire conductor clamped and held by the clamp device as the cutting device undergoes sliding movement.

In accordance with the winding apparatus for an armature constructed as described above, winding-start wire processing, connection processing, and winding-end wire processing can be performed in simple operations, and windings can be provided in a short time.

That is, in winding-start wire processing, the leading end portion of the wire is held at a predetermined position by the clamp device, and simultaneously as the commutator is held in a predetermined set position after being inserted in the axial direction, the leading end portion (winding-start wire) is automatically set at the connection claw. Accordingly, no special operation is required for the winding-start wire processing, so that the processing time can be reduced. In addition, in connection processing, as the hook member mounted eccentrically with respect to the perpendicular axis rotates about the connection claw of the commutator, an intermediate portion of the wire is hooked around the connection claw. Thus, the connection processing can be effected in a simple operation, so that the processing time can be reduced. Furthermore, in winding-end wire processing, the end portion of the wire (winding-end wire) is cut off as the cutting device merely undergoes sliding movement. Accordingly, in this step as well, the winding-end wire processing can be achieved in a simple operation, so that the processing time can be reduced.

Thus the operations for providing windings in each processing step can be simplified, so that windings can be provided in a short time.

The above and other objects, features and advantages of the invention will become more apparent from the following detailed description of the invention when read in conjunction with the accompanying drawings.

DESCRIPTION OF THE PREFERRED EMBODIMENT

Figure 1:
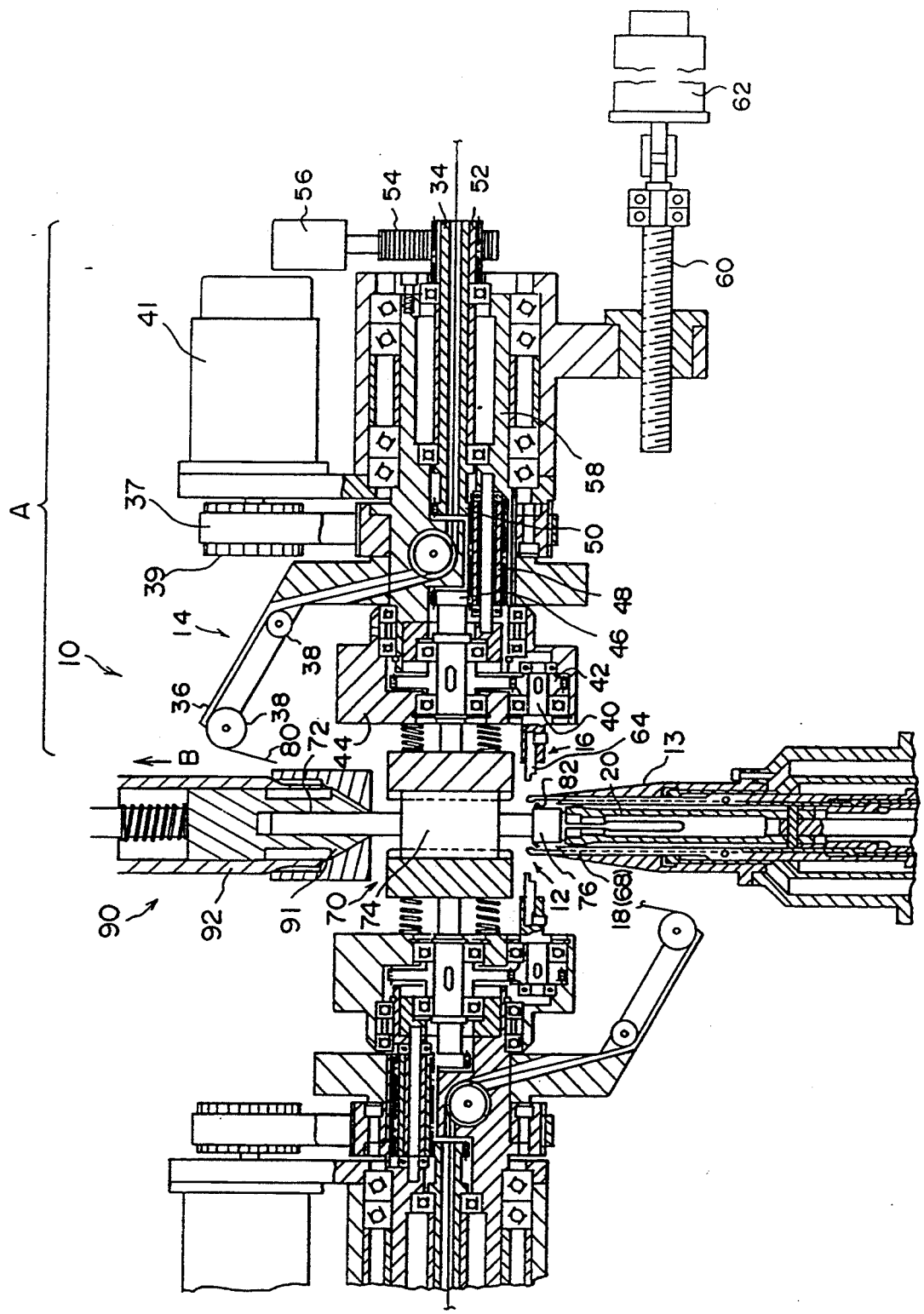
FIG. 1 is a cross-sectional view illustrating an overall configuration of a winding apparatus for an armature in accordance with the present invention.
Figure 2A:
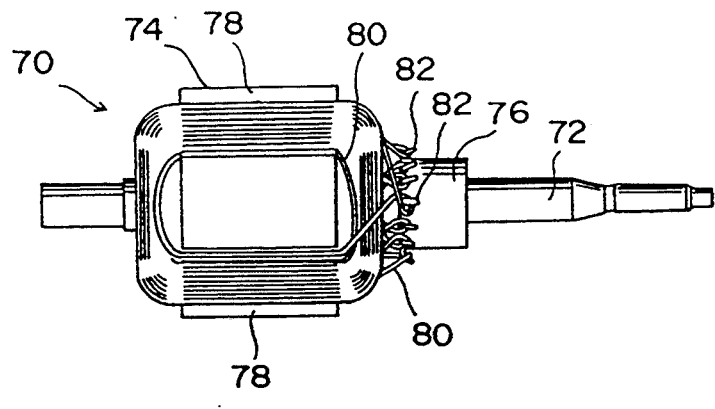
FIG. 2A is an overall diagram of the armature provided with windings by the winding apparatus for an armature.

FIG. 1 is a cross-sectional view of an overall configuration of a winding apparatus 10 for an armature in accordance with the present invention. FIG. 2A shows an armature 70 provided with windings by the winding apparatus 10 for an armature.

As shown in FIG. 2A, the armature 70 is so arranged that a core 74 is secured on a shaft 72 by being pressure-fit thereto and a commutator 76 is also secured thereon adjacent to the core 74. A plurality of slots 78 are formed longitudinally in an outer periphery of the core 74 at equal intervals. A wire 80 is wound in the slots 78 in the form of coils. Meanwhile, connection claws 82 are formed in correspondence with the slots 78 in the core 74 of the commutator 76. The wire 80 wound in the slots 78 is hooked around these connection claws 82.

When the armature 70 is set by a setting device 90 to a position where the armature 70 is subjected to winding processing, the winding apparatus 10 for an armature for providing this armature 70 with windings automatically performs the following processing: winding-start processing for setting a leading end portion (winding-start wire) of the wire 80 at the connection claw 82 of the commutator 76; winding processing for winding the wire 80 in the slots 78 in the core 74; connection processing for hooking an intermediate portion of the wire 80 around the connection claw 82 upon completion of the winding of a fixed portion of the wire 80; and winding-end wire processing for cutting off an end portion (winding-end wire) of the wire 80 upon completion of the winding processing. For this reason, the winding apparatus 10 for an armature has a clamp portion 12 serving as a clamp means for effecting the winding-start wire processing, a winding portion 14 for effecting winding processing, a hook portion 16 serving as a hook means for effecting connection processing, and a cutting portion 18 serving as a cutting means for effecting winding-end wire processing. It should be noted that each of these portions just mentioned is provided in a pair (a set), so that two pieces of wire 80 can be wound at the same time.

As shown in FIG. 1, the setting device 90 has a collect chuck 91 and a holder 92 fitted thereto from the outer side thereof. The collect chuck 91 holds the shaft 72 of the armature 70 by means of a tapered surface formed thereon together with the holder 92 by using the principle of a wedge. The setting device 90 is capable of moving in the direction of arrow B and in a direction opposite thereto in FIG. 1.

The aforementioned component parts will be described hereafter in detail.

(1) Clamp Portion 12

The clamp portion 12 is provided with a collect chuck 20 and a chuck sleeve 21. This clamp portion 12 holds the shaft 72 of the armature 70 inserted therein in the axial direction, so as to hold the armature 70 in a predetermined set position. As shown in detail in FIG. 8, a tapered surface 22 is formed on an outer periphery of this collect chuck 20. The chuck sleeve 21 is fixed, while the collect chuck 20 is movable to press the tapered surface 22 from the outer periphery thereof or cancel the pressing, thereby holding the shaft 72 of the armature 70 or canceling the holding thereof. An outer clamp 24 and an inner clamper 26 are disposed outside the commutator 76 in such a manner as to cover the commutator 76.

Figure 3:
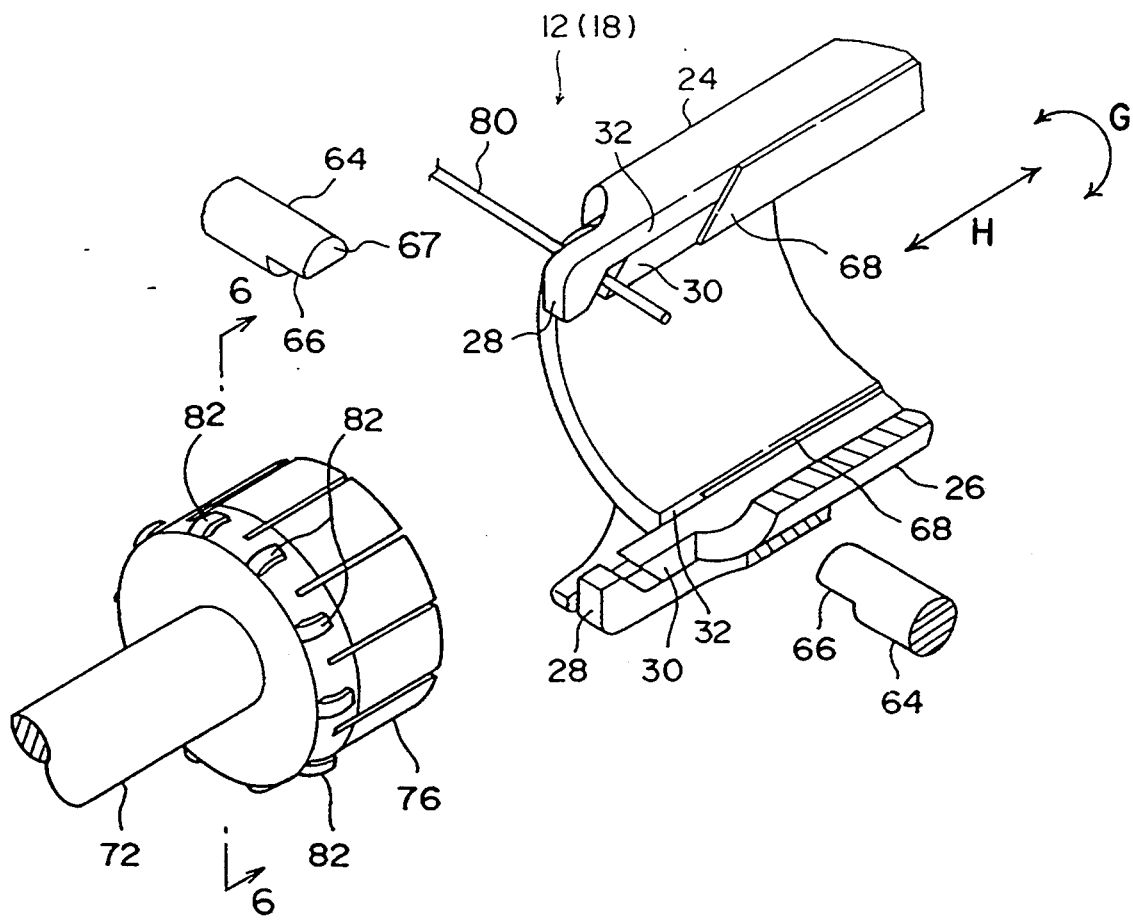
FIG. 3 is a perspective view illustrating the clamp portion and a cutting portion of the winding apparatus for an armature.

Both the outer clamp 24 and the inner clamper 26 have hollow cylindrical configurations, and the collect chuck 20 is accommodated within the inner clamp 26. Both the outer clamp 24 and the inner clamper 26 are capable of rotating about the axis as indicated in FIG. 3 by arrow G. In addition, the inner clamp 26 is capable of moving in a sliding manner along the axis as indicated by the arrow H in FIG. 3.

As shown in detail in FIG. 3, a pair of wire-receiving portions 28 extending along the axis and projecting radially inwardly are formed at a tip of the outer clamp 24 at mutually opposing positions thereof. These wire-receiving portions 28 correspond to a pair of wire-pressing portions 30 formed at a tip portion of the inner clamp 26. The arrangement provided is such that the wire 80 can be clamped and held by the respectively corresponding wire-receiving portions 28 and the wire-pressing portions 30.

Figure 2B:
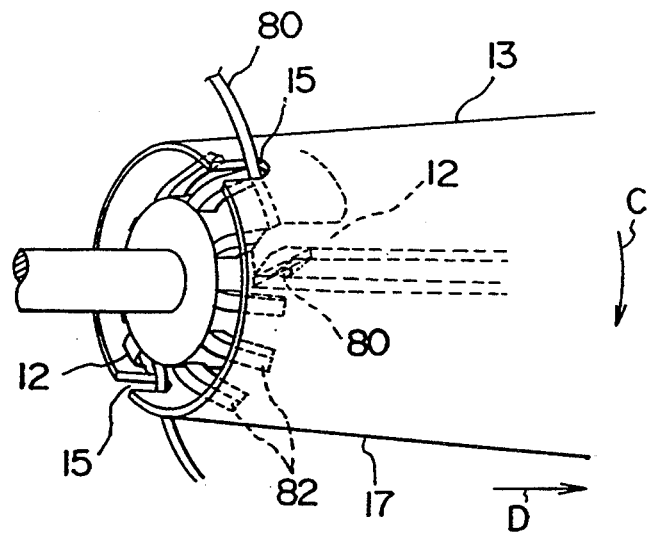
FIG. 2B is a perspective view illustrating an initial state of the winding-start wire processing of a clamp portion.

A slit 32 located adjacent to the wire-receiving portion 28 and the wire-pressing portion 30 is formed along the axis in a portion of each of the outer clamp 24 and the inner clamp 26, and serves as a slidably moving path of a cutter 68 which will be described later. As shown in FIG. 2B, a tubular member 13 is provided outside the outer clamp 24 in such a manner as to accommodate the outer clamp 24 therein. The tubular member 13 is rotatable about the axis through a predetermined angle, and is movable in the axial direction. A pair of notches 15 are formed in a rim of the tubular member 13 on the armature 70 side.

(2) Winding Portion 14

As shown in FIG. 1, a flyer 36 which is rotatable about a hollow shaft 34 is disposed in the winding portion 14. The flyer 36 has a pulley 38 mounted on its tip, and the wire 80 is wound around the pulley 38 and is led to the armature 70. By rotating about the shaft 34, the flyer 36 is capable of winding the wire 80 around the armature 70 (in the slots 78 in the core 74) held in the predetermined set position by means of the collect chuck 20.

(3) Hook Portion 16

In the hook portion 16, a hook shaft 40 having an axis perpendicular to the axis of the commutator 76 is disposed face-to-face relation with one of the connection claws 82 of the commutator 76 held in the predetermined set position by the collect chuck 20. The hook shaft 40 meshes with a gear 42 which is coupled with the gear 52 via gears 46, 48, 50. The gear 52 is coupled with a rack 54 which is driven by an actuator 56. As a result, the hook shaft 40 is rotatively driven by the operation of the actuator 56 via the series of gears. Furthermore, a motor 62 is connected to a base 58 into which the hook shaft 40 is built, via a ball screw 60. As the motor 62 is operated, an entire section A (shown in FIG. 1) of the hook shaft 40 is capable of moving in the axial direction thereof, i.e., in a direction in which it approaches or moves away from one of the connection claws 82 of the commutator 76 held in the predetermined set position by the collect chuck 20.

Figure 5:
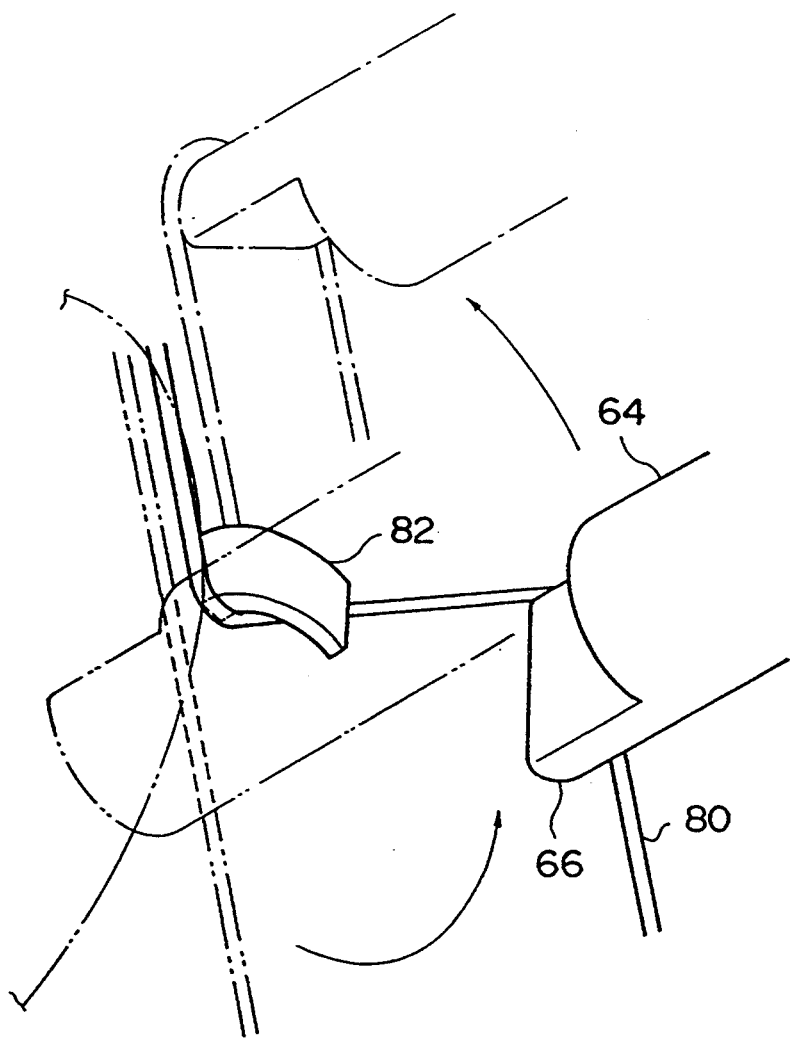
FIG. 5 is a perspective view of a hook portion of the winding apparatus for an armature.

A hook 64 is secured to the hook shaft 40. The hook 64 is substantially cylindrical in shape, and is mounted eccentrically with respect to the axis of the hook shaft 40. As shown in FIGS. 3 and 5, a hooking portion 66 having a semicylindrical configuration obtained by partially cutting off a cylindrical portion thereof is formed at a tip of the hook 64 to facilitate the hooking of the wire 80. It should be noted that the dimensions of the respective parts are set such that in a state in which the hook shaft 40 has approached one of the connection claws 82 of the commutator 76, the hooking portion 66 of the hook 64 is located in the vicinity of the outer peripheral portion of the connection claw 82. Accordingly, when the hook shaft 40 rotates in the state in which the hooking portion 66 of the hook 64 has approached the connection claw 82, the hook 64 (hooking portion 66) rotates about a line which the connection claw 82 passing through the connection claw 82.

(4) Cutting Portion 18

Figure 8:
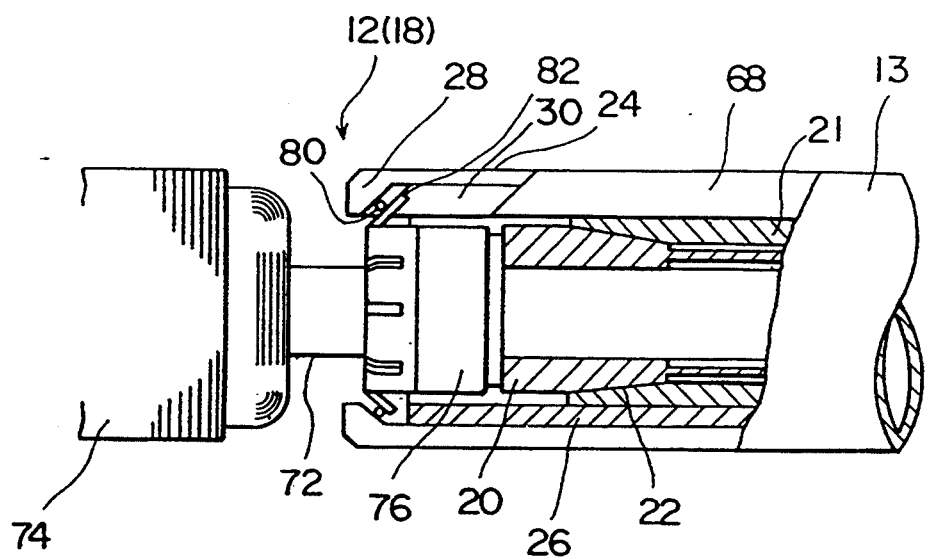
FIG. 8 is a cross-sectional view illustrating a state in which the wire is cut during winding-end wire processing.

A cutter 68 is disposed in the cutting portion 18. As shown in FIGS. 3 and 8, the cutter 68 is disposed in such a manner as to be slidably movable along the slit 32 formed in a portion of each of the outer clamp 24 and the inner clamp 26. That is, the cutter 68 together with the inner clamp 26 is incorporated in the outer clamp 24, so that the cutter 68 is virtually built in the clamp portion 12. As the cutter 68 moves in a slidable manner along the slit 32, the cutter 68 is capable of cutting the wire 80 clamped and held by the wire-receiving portion 28 and the wire-pressing portion 30. The sliding motion of the cutter 68 is interlocked with the wire-clamping motion of the inner clamp 26, and the amounts of sliding movement of the respective parts are such in such a manner that the cutter 68 cuts the wire 80 immediately after the inner clamp 26 clamps and holds the wire 80.

A description will now be given of the operation this embodiment.

The setting device 90 located away from the clamp 12, i.e., away from the winding apparatus 10 for an armature, sets the armature 70 by moving in a direction opposite to that of arrow B in FIG. 1 while clamping the shaft 72 of the armature 70 by means of the collect chuck 91. As the armature 70 is set, the holding of the shaft 72 by means of the collect chuck 91 is canceled, and the winding apparatus 10 for an armature is set in a standby state at that position.

With the winding apparatus 10 for an armature constructed as described above, each processing including winding-start wire processing, winding processing, connection processing, and winding-end wire processing is performed automatically.

(1) Winding-Start Wire Processing

Figure 2C:
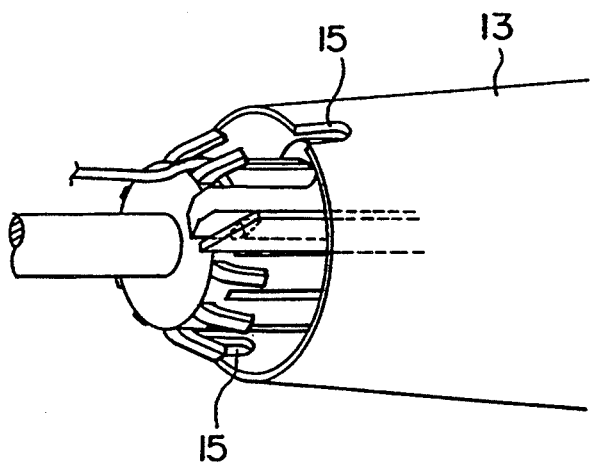
FIG. 2C is a perspective view illustrating an interim state of winding-start wire processing of the clamp portion.
Figure 4:
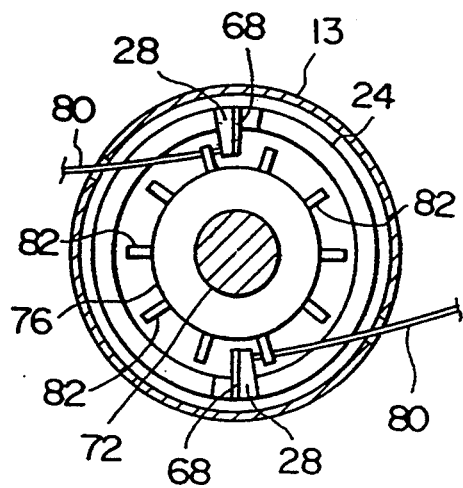
FIG. 4 is a cross-sectional view taken along line 6—6 of FIG. 3 and illustrates a state during winding-start wire processing.

In the winding-start wire processing, the tip of the wire 80 is clamped by the wire-receiving portion 28 and the wire-pressing portion 30 of the clamp portion 12 and is held in advance at a predetermined position (in the state shown in FIG. 3). Here, the armature 70 is inserted in the axial direction, the holding of the shaft 72 by means of the collect chuck 79 is canceled, and the shaft 72 is clamped by the collect chuck 20, thereby allowing the commutator 76 to be held in a predetermined set position. Immediately before the commutator 76 is held in the set position, the tubular member 13 rotates, and a portion of the wire 80 between a portion thereof clamped by the clamp portion 12 and a portion thereof supported at the notch 15 becomes taut. In that state, the commutator 76 is inserted, and one of the connection claws 82 catches the taut portion of the wire 80. That is, as shown in FIG. 4, the wire 80 is caught by the connection claw 82. Immediately after that, the tubular member 13 moves in the direction of arrow D in FIG. 2B to allow the wire 80 to be disengaged from the notch 15. Then, the tubular member 13 rotates in the direction of arrow C in FIG. 2B through a predetermined angle, and then moves in the opposite direction of arrow D to push in the wire 80. Through this operation, the wire 80 is securely caught by the connection claw 82. Subsequently, the tubular member 13 retracts to the position shown in FIG. 2C. The rotation and sliding motion of the tubular member 13 is effected by motors not depicted. In this manner, the tip portion (winding-start wire) of the wire 80 is automatically set on the connection claw 82 of the commutator 76. Accordingly, no operation is required for winding-start wire processing, so that the processing time can be reduced.

As is shown in FIG. 4, the clamp portion 12 clamps the wire 80 between portions 28 and 30 in a radial direction of the commutator 76, proximate the outermost end portions of the adjacent claws 82. Accordingly, the operations involved in the winding-start processing can be reduced.

Winding processing is carried out after the winding-start wire processing.

(2) Winding Processing

In winding processing, the flyer 36 of the winding portion 14 rotates about the shaft 34, whereby the wire 80 is wound in the form of a coil in the slots 78 in the core 74 held in the set position. Upon completion of a fixed amount of winding processing, connection processing is carried out. After the wire 80 is wound a number of turns into a first coil, the clamp portion 12 cancels the clamping of the tip of the wire 80.

(3) Connection Processing

Figure 6:
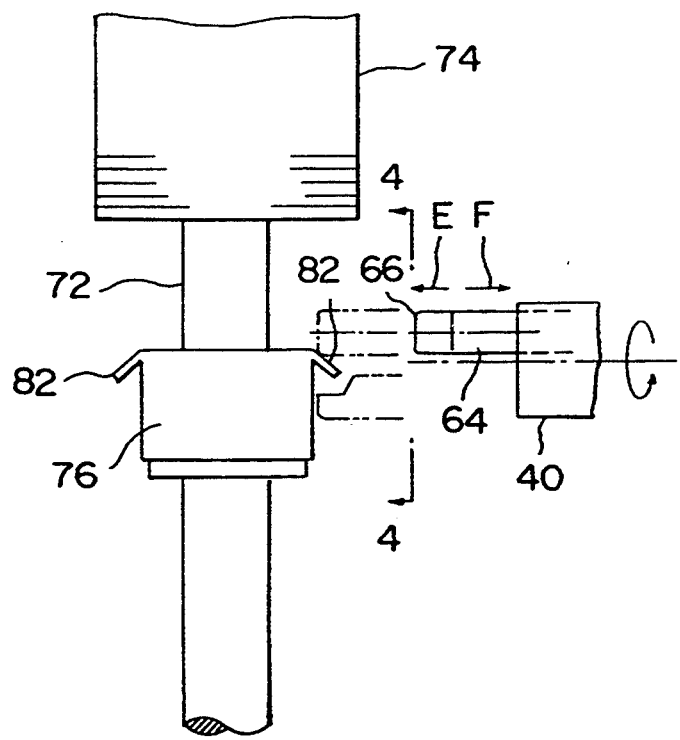
FIG. 6 is a plan view illustrating the operation of a hooker at a time when a wire is hooked around each connection claw of the armature.
Figure 7A:
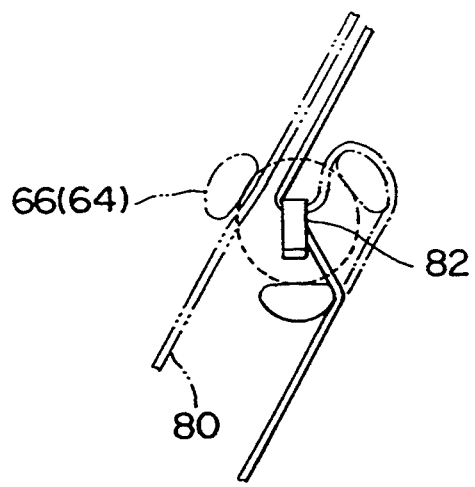
FIG. 7A is a cross-sectional view taken along line 4—4 of FIG. 6 and illustrates the operation of the hooker.

Connection processing is effected as the hook portion 16 is actuated after the flyer 36 rotates and is located on the clamp portion 12 side. That is, the motor 62 is operated, so that the base 58 in which the hook shaft 40 is incorporated is moved in a direction in which the base 58 approaches one of the connection claws 82 of the commutator 76 held in the set position (in the direction of arrow E in FIG. 6). As a result, the hooking portion 66 at the distal end of the hook 64 approaches the connection claw 82, and abuts against the wire 80, as indicated by the two-dotted chain line in FIG. 5. The hooking portion 66 abuts against the wire 80 from the side away from the connection claw with the wire 80 placed therebetween (see FIG. 7A).

Figure 7B:
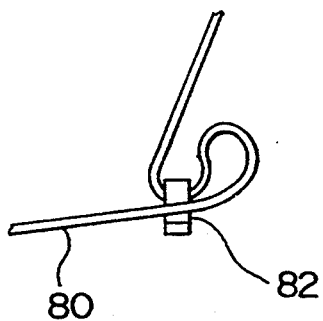
FIG. 7B is a cross-sectional view taken along line 4—4 of FIG. 6 and illustrates the movement of the wire immediately after the retraction of the hooker.
Figure 7C:
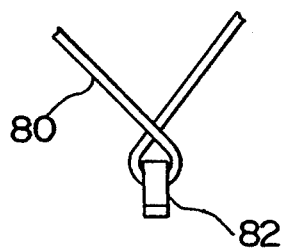
FIG. 7C is a cross-sectional view taken along line 4—4 of FIG. 6 and illustrates the movement of the wire immediately after the retraction of the hooker.

Then, the hook shaft 40 is rotated as the actuator 56 is actuated. As the hook shaft 40 rotates, the hooking portion 66 of the hook 64 rotates about the connection claw 82 while hooking the wire 80, as shown by the solid line in FIG. 5. As a result, an intermediate portion of the wire 80 is hooked around the connection claw 82, as shown by the dot-chain line in FIG. 5. Subsequently, the motor 62 is operated again, so that the hook shaft 40 together with the hook 64 is moved away from the connection claw 82 (in the direction of arrow F in FIG. 6). Consequently, the hooking portion of the hook 64 with the wire 80 hooked around it is disengaged from the wire 80. While the hook 64 is at its forward position, the rotation of the flyer 36 around the shaft 34 is stopped. As soon as the hook 64 is retracted, the flyer 36 begins to rotate about the shaft 34, and pulls the wire 80, thereby causing the wire 80 to be displaced from a position shown in FIG. 7B to a position shown in FIG. 7C. Then, as shown in FIG. 7C, the wire 80 is connected around the connection claw 82 in the shape of α. This completes the connection processing for hooking the intermediate portion of the wire 80 around the connection claw 82.

Thus, the connection processing can be accomplished by a simple operation in which the hook 64 is made to approach the connection claw 82 and is merely rotated, so that the processing time can be reduced.

After completion of connection processing, the collect chuck 20 holding the shaft 72 rotates about its axis through a predetermined angle so as to cause the commutator 76 to rotate through a predetermined angle. Then, the above-described winding processing and connection processing are consecutively carried out with respect to an adjacent one of the slots 78. When the wire 80 is wound in all the slots 78, winding-end wire processing is effected.

(4) Winding-End Wire Processing

Figure 9:
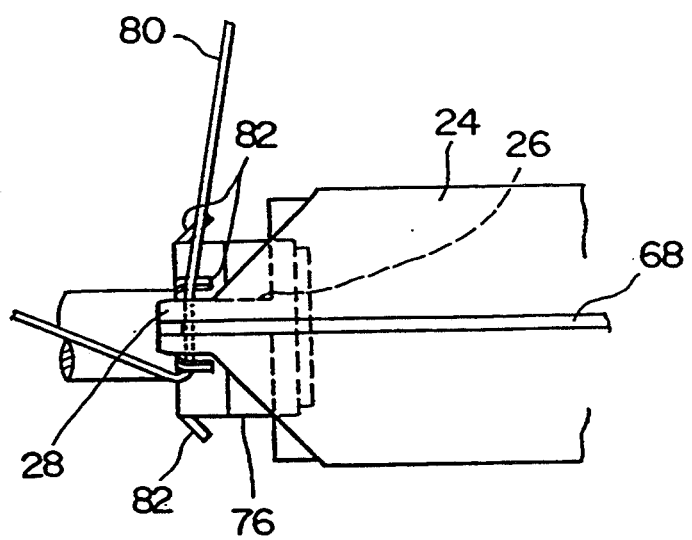
FIG. 9 is a plan view corresponding to FIG. 8 and illustrating a state in which the wire is cut during winding-end wire processing.
Figure 10:
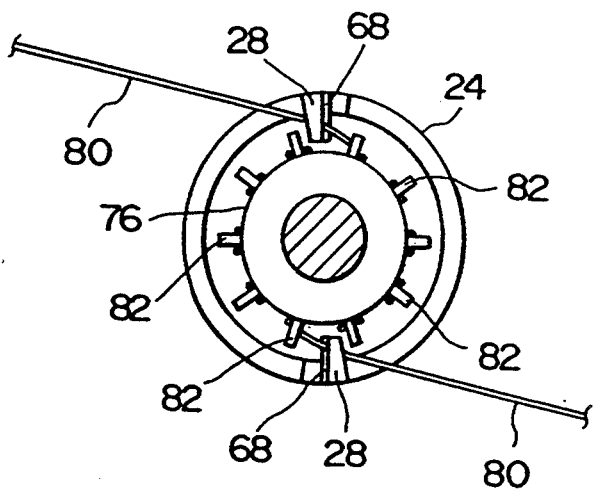
FIG. 10 is a cross-sectional view of the cutting portion illustrating a state in which a cutter has been operated.

The cutting portion 18 is actuated during winding-end wire processing. After completion of all the winding processing, i.e., after connection processing is completed with respect to the connection claw 82 which was lastly connected, a portion of the wire 80 which is to be cut is pulled by the pulley 38 of the flyer 36 and the lastly connected connection claw 82 to a position in which the wire 80 can be clamped by the wire-receiving portion 28 and the wire-pressing portion 30. Then, the tubular member 13 which is normally at a retracted position with respect to the clamp portion 12 advances toward the setting device 90, and the portion of the wire 80 to be cut is tucked in by the notch 15 formed in the tubular member 13, as shown in FIG. 2B. The end portion (winding-end wire) of the wire 80 is clamped and held by the wire-receiving portion 28 and the wire-pressing portion 30, as shown in FIGS. 8 and 9, as the inner clamp 26 moves toward the commutator 76. Furthermore, the cutter 68 is moved in a sliding manner in interlocking relation with the wire-clamping operation of the inner clamp 26. Through this sliding movement of the cutter 68, the end portion (winding-end wire) of the wire 80 held by the wire-receiving portion 28 and the wire-pressing portion 30 is cut off (in the state shown in FIG. 10). After cutting, the end portion of the wire 80 wound around the armature 70 is caught by the connection claw 82, so that the end portion does not come off even if no special terminal treatment is provided. As shown in FIGS. 8 and 10, the cutter 68 cuts the wire 80 near the outermost end portions of the adjacent claws 82. Accordingly, the operations involved in the winding-end processing can be reduced, and there is no need to dispose of excess wire.

In the manner described above, the winding-end wire processing can be implemented with a simple operation, so that the processing time can be reduced.

Upon completion of the winding processing with respect to the armature 70, the collect chuck 91 holds the shaft 72 of the armature 70. The collect chuck 20 of the clamp portion 12, which was holding the opposite side of the shaft 72, cancels its holding of the shaft 72 as the holder 21 retracts. The setting device 90 holding the shaft 72 then retracts.

As described above, with the winding apparatus 10 for an armature, it is possible not only to automatically provide windings, but also to simplify operations for performing winding-start wire processing, connection processing, and winding-end wire processing in the respective steps of processing, so that windings can be provided in a short time overall.

As described above, the winding apparatus for an armature in accordance with the present invention offers an outstanding advantage in that windings can be provided by simple operations in a short time.

What is claimed is:

1. A winding apparatus for automatically providing an armature having a core and a commutator with windings by winding a wire conductor around an outer periphery of the core of the armature and hooking the wire conductor around connector claws that extend from the commutator of the armature, comprising:

means for positioning a commutator of an armature in at least one predetermined set position such that the axis of the commutator extends substantially along a predetermined line;

a hook member positioned adjacent said predetermined set position; and driving means coupled to said hook member for moving said hook member toward and away from said predetermined line substantially along a line perpendicular to said predetermined line, and for rotating said hook member about said perpendicular line, wherein said driving means is operable to move said hook member toward said predetermined line so that said hook member engages a wire conductor, to subsequently rotate said hook member such that said hook member draws the wire conductor around a connector claw of a commutator positioned by said means for positioning, and to move said hook member away from said predetermined line such that said hook member disengages said wire conductor.

2. A winding apparatus as set forth in claim 1, wherein said hook member comprises a hooking portion that is engageable with the wire conductor, said hooking portion having a semi-cylindrical portion.

3. A winding apparatus as set forth in claim 2, wherein said semi-cylindrical portion extends substantially along a line parallel to said perpendicular line.

4. A winding apparatus as set forth in claim 3, wherein said hook member further comprises a hook shaft coupled to said hooking portion and to said driving means and extending along said perpendicular line, said hook shaft being rotatable about said perpendicular line by said driving means.

5. A winding apparatus for automatically providing an armature having a core and a commutator with windings by winding a wire conductor around an outer periphery of the core of the armature and hooking the wire conductor around connector claws that extend from the commutator of the armature, comprising:

means for positioning a commutator of an armature in at least one predetermined set position such that the axis of the commutator extends substantially along a predetermined line;

a hook member positioned adjacent said predetermined set position;

driving means coupled to said hook member for moving said hook member toward and away from said predetermined line substantially along a line perpendicular to said predetermined line, and for rotating said hook member about said perpendicular line, wherein said driving means is operable to move said hook member toward said predetermined line so that said hook member engages a wire conductor, to subsequently rotate said hook member such that said hook member draws the wire conductor around a connector claw of a commutator positioned by said means for positioning, and to move said hook member away from said predetermined line such that said hook member disengages said wire conductor;

a clamping system positioned adjacent said predetermined set position for clamping a wire conductor, said clamping system including an outer clamper member and an inner clamper member slidingly and rotatably mounted to said outer clamper member; and a cutter slidingly mounted to said clamping system for cutting the wire conductor that is clamped by said clamping system.

6. A winding apparatus as set forth in claim 5, wherein said outer clamp member comprises a hollow substantially cylindrical member with at least one wire-receiving portion at an end thereof, and said inner clamp member comprises a hollow substantially cylindrical member with at least one wire-pressing portion at an end thereof that corresponds to said at least one wire-receiving portion, wherein the wire conductor may be received between said wire-receiving portion and said wire-pressing portion.

7. A winding apparatus as set forth in claim 5, wherein said inner clamp member and said outer clamp member each have an opening, and a portion of said cutter is slidingly mounted in each said opening.

8. A winding apparatus as set forth in claim 5, wherein said hook member comprises a hooking portion that engages the wire conductor, said hooking portion having a semi-cylindrical portion.

9. A winding apparatus as set forth in claim 8, wherein said semi-cylindrical portion extends substantially along a line parallel to said perpendicular line.

10. A winding apparatus as set forth in claim 9, wherein said hook member further comprises a hook shaft coupled to said hooking portion and to said driving means and extending along said perpendicular line, said hook shaft being rotatable about said perpendicular line by said driving means.

11. A winding apparatus as set forth in claim 9, wherein said clamping system further comprises a substantially tubular member slidingly and rotatably mounted around said outer clamper member.

12. A winding apparatus as set forth in claim 11, wherein said tubular member being provided with at least one notch for receiving the wire conductor.

13. A winding apparatus for automatically providing an armature having a core and a commutator with windings by winding a wire conductor around an outer periphery of the core of the armature and hooking the wire conductor around connector claws that extend from the commutator of the armature, comprising:

means for positioning a commutator of an armature in at least one predetermined set position such that the axis of the commutator extends substantially along a predetermined line;

a clamping system positioned adjacent said predetermined set position for clamping a wire conductor, said clamping system including an outer clamper member and an inner clamper member slidingly and rotatably mounted to said outer clamper member; and a cutter slidingly mounted to said clamping system for cutting a wire conductor that is clamped by said clamping system.

14. A winding apparatus as set forth in claim 13, wherein said outer clamp member comprises a hollow substantially cylindrical member with at least one wire-receiving portion at an end thereof, said inner clamp member comprises a hollow substantially cylindrical member with at least one wire-pressing portion at an end thereof that corresponds to said at least one wire-receiving portion, wherein the wire conductor may be received between said wire-receiving portion and said wire-pressing portion.

15. A winding apparatus as set forth in claim 13, wherein said inner clamp member and said outer clamp member each have an opening, and a portion of said cutter is slidingly mounted in each said opening.

16. A winding apparatus as set forth in claim 14, wherein said clamping system further comprises a substantially tubular member slidingly and rotatably mounted around said outer clamper member.

17. A winding apparatus as set forth in claim 16, wherein said tubular member being provided with at least one notch for receiving the wire conductor.

* * * * *